United States Patent Office 2,782,528
Patented Feb. 26, 1957

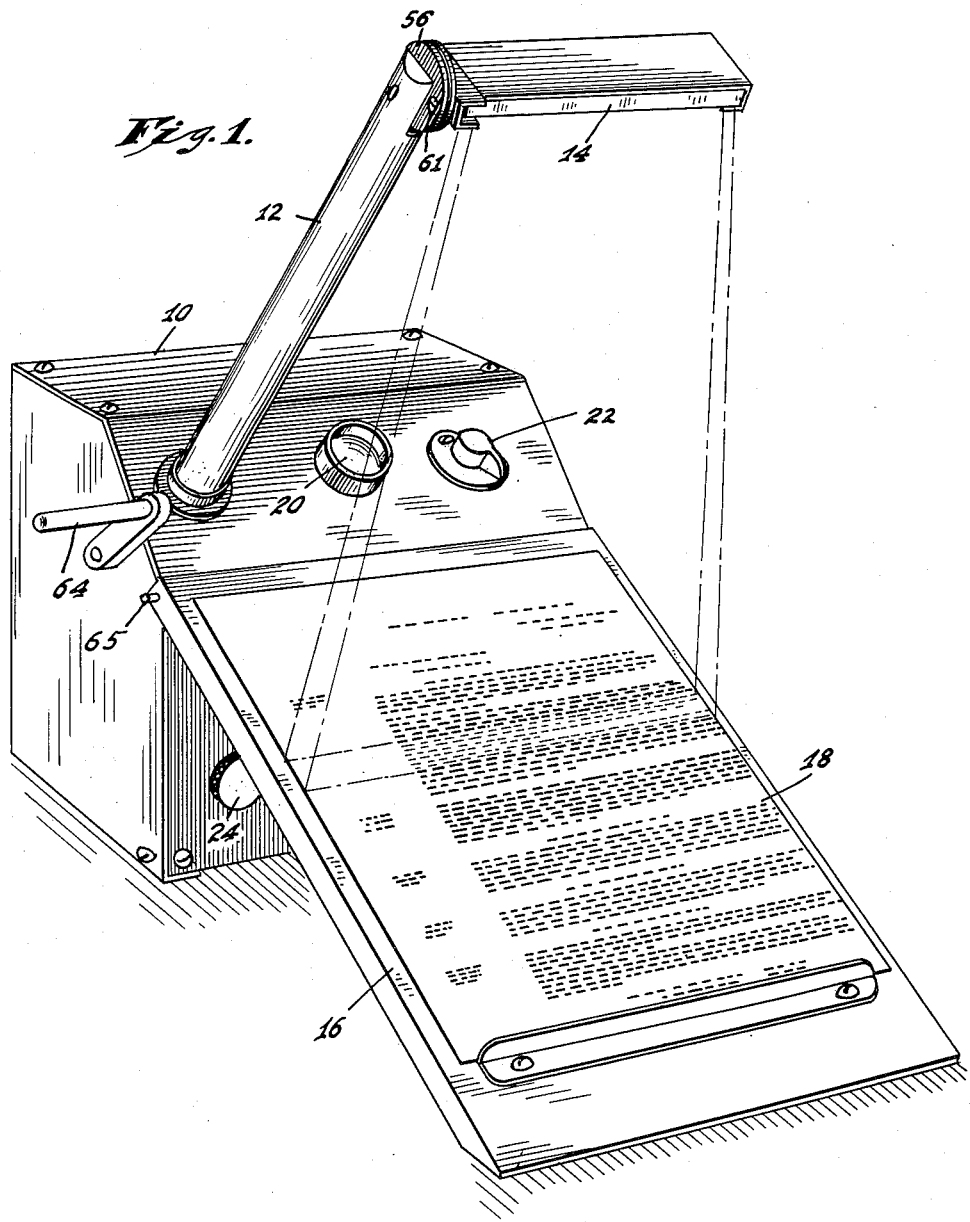

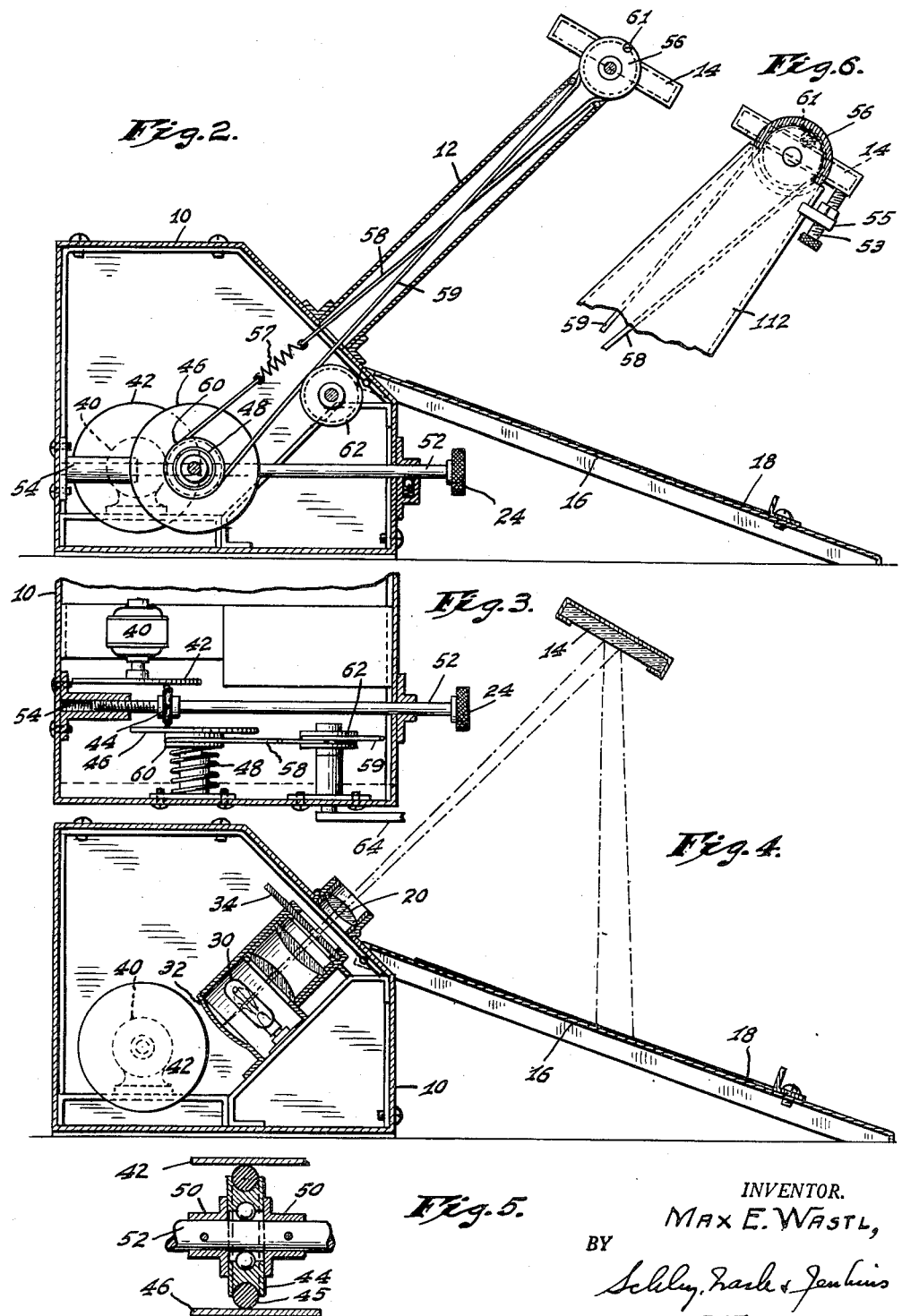

2,782,528

READER TRAINING DEVICE

Max E. Wastl, Lafayette, Ind.

Application August 27, 1952, Serial No. 306,710

17 Claims. (Cl. 35—35)

This invention relates to a reader training device, more particularly to a reader-pacing device for training in rapid reading.

It is the primary object of the invention to provide a device for pacing the rate at which a reader reads and which is flexible and avoids the presence of masks or other apparatus in the line of sight of the reader. It is a further object of the invention to provide a reader pacing mechanism in which the pacing is done by a moving beam or pattern of light. It is a further object of the invention to provide a device of this sort in which both the intensity of the light pattern and the pacing rate are adjustable. It is a still further object of the invention to provide such reader-training apparatus in a compact, portable and inexpensive device.

In accordance with the invention, a guiding pattern of illumination or shadow is moved across the reading matter at a suitable rate in the direction of normal reading thereof.

The guiding pattern may consist of a single shadow line or bright line or a group of such lines, but desirably, the guiding pattern comprises a reading area which is illuminated at a relatively higher intensity than adjacent areas, and is delineated by one or more boundaries between areas of higher intensity and areas of lower intensity. The reading area of higher intensity is conveniently a narrow band extending transversely of the page of reading matter and of a width to include a few lines of the reading matter. It may be of adjustable width, but normally and as here shown, an area of fixed width is satisfactory. The reading area may be defined by narrow areas, even lineal areas, of lower intensity illumination, but preferably the light from the pacing device is restricted, as by a slit, to produce a thin wide beam which illuminates only the reading area, leaving the rest of the page of reading matter at a lower intensity produced by general illumination. Whatever the guiding pattern it is desirably of adjustable intensity so that it can be progressively dimmed toward and to extinction as the reader progresses in learning.

Movement of the pattern of illumination downward across the reading matter is conveniently and preferably obtained by including a mirror or other light directing device in the optical system, and rotating that device to cause its reflected light or pattern to sweep the reading matter at a timed rate. The rate of movement is desirably adjustable under reader-operated control, and reader operable handle is provided to return or otherwise move the pattern of illumination to a starting position.

The mirror rotation may be driven by any suitable drive which provides an adjustable rate of mirror movement. I prefer to use a constant speed electric motor as the prime driving source, and to drive through a variable speed transmission.

The accompanying drawings illustrate the invention. In such drawings:

Fig. 1 is a perspective view of a device embodying my invention;

Fig. 2 is a vertical section taken in the plane of the axis of the mirror-supporting post;

Fig. 3 is a horizontal section showing the variable-speed driving mechanism for the mirror;

Fig. 4 is a vertical section taken in the plane of the axis of the optical system;

Fig. 5 is an enlarged fragmental view showing in section the idler wheel of the mirror-driving apparatus; and Fig. 6 is a fragmental vertical section similar to Fig. 2 showing a preferred mirror drive and stop.

The device shown in Fig. 1 comprises a housing 10 containing a light projector 20 and timed driving mechanism, and upon which is supported a post 12 which carries a rectangular mirror 14 which is rotatable about a horizontal axis. The front of the housing 10 removably supports the upper end of a shell 16 to receive and support reading material 18. The lens barrel of the light projector extends through an inclined front panel of the housing 10, and that panel carries a handle 22 for a light controlling switch and rheostat. A control knob 24 lying against the front wall of the housing 10, beneath the shelf 16, controls the rate of rotation of the mirror 14.

As shown in Fig. 4, the optical system comprises a lamp 30 having a mirror 32 behind it and a lens system in front of it. A mask 34 in the path of the light beam defines a narrow slit extending parallel to the axis of the mirror 14. The mask 34 may be of adjustable width, but such adjustment is usually not essential, and the mask 34 shown has a slit of fixed width, but is removable to permit replacement with a mask of a different slit-width if desired. The light passing through the slit is projected as a flat wide beam onto the mirror 14 and is reflected thereby downward onto the reading matter 18 supported on the shelf 16. The reading area illuminated by the reflected light beam extends the full width of the page of reading matter 18, but is narrow in the direction longitudinally of the page so that it illuminates only a few lines of print.

To cause the area of illumination to travel down the page, the mirror 14 is rotated about its horizontal axis. Mirror-rotation is obtained by the variable-speed mechanism shown in Figs. 2 and 3. A constant speed motor 40 drives a disk 42, and the rotation of such disk 42 is transmitted by an idler wheel 44 to an opposed disk 46, to drive that disk 46 in the opposite direction. The disk 46 is mounted on a shaft offset from the axis of the disk 42, and is yieldingly urged, as by a spring 48, toward the disk 42. As a result, the idler wheel 44 is in spring loaded frictional engagement with the two disks 42 and 46.

The idler wheel 44 has a rubber or other tire 45, to make frictional engagement with the disks 42 and 46, and is rotatably carried, as on ball bearings, between a pair of collars 50 on an axially movable shaft 52. The rear end of the shaft 52 is threaded and is engaged in a threaded sleeve 54 mounted on the rear wall of the housing 10. The front end of the shaft 52 projects through the front wall of the housing 10 and carries the control knob 24. Rotation of the knob 24 screws the shaft 52 in or out with respect to the sleeve 54, to move the idler wheel 44 axially of itself and radially with respect to the two disks 42 and 46. By such axial movement of the idler 44, the rate of rotation of the driven disk 46 is varied with respect to the constant speed of the driving disk 42.

The mirror 14 is carried at the upper end of the post 12 in a carrier on a pulley 56 rotatable on the axis of pivotal movement of the mirror 14. This mirror pulley 56 is connected by a cable 58—59 to a pulley 60 driven by the variable-speed disk 46, and desirably the cable is secured at one point to the mirror pulley 56 as by a set screw 61. Since the mirror is intended to rotate through only a limited angle, whereas the driving disk 42 rotates continuously, the driving train includes a frictional drive connection. This may be provided by a frictional connection between the pulley 60 and the disk 46, but preferably, I use the frictional engagement between the cable 58—59 and the pulley 60 to provide the frictional connection. As shown in Fig. 2, the driven disk 46 rotates clockwise to cause the mirror 14 to rotate counter-clockwise. One stretch of the cable desirably includes a spring 57 to maintain the cable in proper tension. The counter-clockwise rotation of the mirror 14 causes the illuminated area on the reading matter 18 to move downward from the top to the bottom of the page.

In the preferred construction shown in Fig. 6, the post 112 is wider than that in Fig. 2 so that it permits the cable 58—59 to extend straight from the pulley 56 to the pulley 60, and the pulley 56 also forms a control knob operable by the reader to return the mirror 14 to starting position. (In this case, the control mechanism 62—64 shown in Figs. 1 and 2 and described below is not used.) The pulley 56 is knurled on its outer surface, the pulley groove is deep, and the knurled outer surface is exposed over a considerable portion of its circumference. Desirably, a stop is provided to limit the clockwise movement of the mirror as it is reset to starting position. In the construction of Fig. 6, the stop is conveniently provided by a screw 53 carried by a bracket 55 on the post 112. The upper end of the screw 53 lies in the path of the mirror carrier to stop the clockwise movement of the mirror at the desired adjusted position. When the mirror has been rotated counterclockwise by the driving mechanism to carry the illuminated area on the reading matter 18 to the bottom of the page, the reader rotates the pulley 56 clockwise, as with his thumb, to return the mirror to the position determined by the stop 53, which brings the illuminated area back to the top of the page. During such movement, the cable 58—59 moves with the pulley 56, being fixed thereto by the set screw 61, and slides on the driving pulley 60.

In the construction shown in Fig. 2, the stretch 59 of the cable is wound one or more turns around a control pulley 62 carried on a shaft which projects through the side wall of the housing 10. This shaft carries a manually operable crank 64, which is positioned to lie against a stop 65 when the illuminated reading area is at the top of the page 18. As the mirror is driven counter-clockwise to sweep the light beam downward across the page, the control pulley 62 and its crank 64 are likewise driven counter-clockwise to carry the crank away from the stop 65. When this operation has carried the light beam to the bottom of the page, the crank 64 is manually turned clockwise to again bring it back against the stop 65. Movement of the crank 64 to rotate the control pulley 62 clockwise pulls the cable 58 in a direction to turn the mirror pulley 56 clockwise and return the mirror to a position in which the beam of light is projected onto the page at the top thereof. Since the cable makes a full turn around the control pulley 62 but only about a half turn around the pulley 60, the manual operation of the crank 64 to turn the pulley 62 causes the frictional drive connection in the driving train to slip and thus to permit the mirror to be returned to a position for illuminating the top of a page. In the construction shown, the cable 58—59 slips on the pulley 60, and as in Fig. 6, the cable is secured to the pulley 56 by a set screw 61.

In using the device for reader training, the reader is seated in a convenient position to read the material 18 supported on the shelf 16. The projector lamp is turned on and adjusted to the desired level of intensity, the stop 53 is suitably adjusted to fix the starting position of the mirror, the knob 24 is adjusted to give the desired pacing rate, and the mirror 14 is moved, by the knurled pulley 56 (or by the crank 64 in the device of Fig. 1) to its starting position to project the light beam on the area at the top of the page. The driving mechanism then causes the mirror to rotate counter-clockwise, and this causes the illuminated area on the reading matter to move downward over the page at the rate predetermined by the setting of the knob 24. The movement of the illuminated area paces the reader while he reads the material 18 supported on the shelf 16.

As the illuminated area reaches the bottom of the page of reading material 18, the page is turned or a new page laid on the shelf 16, and the mirror is rotated clockwise to carry the illuminated area back to the top of the page. As the reader's speed of reading increases, the pacing rate can be increased. For this, the knob 24 is adjusted to move the idler wheel 44 outward on the disk 42 and hence inward on the disk 46, which increases the speed of the disk 46 and increases the speed of rotation of the mirror 14, and this in turn increases the rate at which the illuminated area travels down a page of material supported on the shelf 16. As the reader learns rapid reading, the intensity of the guiding pattern can be progressively reduced, to force the reader to rely less on the pacer and more on himself.

I claim as my invention:

1. A reading pacer for pacing the reading of reading material supported on a fixed support, comprising an optical system which casts on the reading matter a transverse linear band of illumination of higher light intensity than adjacent areas of the reading material and thereby defines a reading area, said system including a movable light reflecting device in the path of the band-producing light, and speed regulated means to move said device to cause said reading area to move progressively downward over the reading matter at a predetermined rate.

2. A reading pacer as defined in claim 1 with the addition of reader-operable control means for moving said device to bring the reading area to the top of the reading matter.

3. A reading pacer, comprising a light projector, a mirror rotatable on a transverse axis in the light path to reflect a pattern of light on reading matter supported on a fixed support, a pulley operatively connected to the mirror, a driving pulley, a speed-regulated drive for the driving pulley, a cable frictionally engaging around said pulleys, and reader-operable means to slip the cable on one of said pulleys to move the mirror to a starting position.

4. A reading pacer, comprising a housing, a reading matter support extending forwardly from the housing, a light projector in the housing to project light upwardly over the reading matter support, a mirror supported in the path of light above the reading matter support, said mirror being rotatable on an axis lying transversely of the light path and of the reading matter support, and variable speed driving means to rotate the mirror.

5. A reading pacer as defined in claim 4 including reader operable means to move the mirror to a starting position.

6. A reading pacer, comprising means to display a multiple-line passage of reading matter in a stationary reading position in full view of a reader, illumination means including a light projecting system for illuminating to a predetermined intensity from outside the reader's field of vision of the passage a transverse portion of the passage extending fully across the passage with an edge of the illuminated portion running parallel with the passage lines, thereby forming on the passage a pattern of illumination in which said portion is illuminated differently from an adjacent area on the opposite side of said edge, said illumination means also including movable means controlling the position of said transverse portion and edge with respect to the passage, and driving means for said movable means to cause said edge to move at a steady pace in a line-to-line direction along the passage.

7. A reading pacer according to claim 6 with the addition of reader operable means to adjust the amount of light projected onto said passage by said system.

8. A reading pacer according to claim 6 with the addition of reader-operable means for adjusting said last-named means to vary the pace at which said edge is caused to move.

9. A reading pacer for pacing the reading of multiple-line reading matter, such as an ordinary book, printed page, or the like, held in a stationary position fully exposed to the view of a reader, comprising light projecting means to project onto the face of the reading matter from outside the reader's field of view of the reading matter a transverse linear band of illumination of a width and length to contain one or more complete lines of reading matter and of a higher intensity than upwardly and downwardly adjacent areas of the reading matter, light directing means controlling the position of said band on the reading matter, and speed-controlled drive means for said directing means to cause said band to move at a steady pace downward over the reading matter.

10. A reader pacer according to claim 9 with the addition of reader-operable means for actuating said light-directing means to cause said band to move back to the top of the reading matter.

11. A reader pacer according to claim 9 with the addition of reader-operable means to vary the speed at which said directing means is driven.

12. A reader pacer according to claim 9 with the addition of reader operable means to vary the intensity of illumination of said band.

13. A reading pacer, comprising an optical system for producing on multiple-line reading matter held in a stationary fully exposed reading position a pattern of illumination containing areas of different intensity illumination defining therebetween a demarcation line extending transversely across the reading matter parallel with the lines thereof, said system including a mirror rotatable on an axis transverse to the light path and controlling the position of the pattern on the reading matter, means to rotate the mirror to move the pattern downward over the reading matter, and means for adjusting the rotating means to vary the rate at which the mirror is rotated.

14. A reading pacer according to claim 13 with the addition of reader operable means for reversely rotating the mirror and in which the mirror is connected to the mirror-rotating means through a friction drive which slips when said mirror is reversely rotated.

15. A reading pacer, comprising a light projector, a mirror rotatable on a transverse axis in the light path to reflect a pattern of light on reading matter held in a predetermined stationary position, a constant speed driving means, a variable speed transmission operatively driven by said driving means and operatively connected to rotate said mirror, and a reader-operable control member operative to vary the speed ratio of said transmission.

16. A reading pacer, comprising a support to hold a page of reading material fully exposed to general illumination in a stationary reading position in full view of a reader, a light source, an optical system to project onto the face of the page from outside the field of the reader's view of the page a transverse band of additional illumination from said light source, said system including movable means controlling the position of the band with respect to the page, and time-controlled driving means for said movable means to cause said band to move at a steady rate downward over the page to pace the reading thereof, and adjustable control means to decrease the intensity of the additional illumination.

17. A reading pacer for pacing the reading of multiple-line reading matter, such as an ordinary book, printed page, or the like, held in a stationary position fully exposed to the view of a reader, comprising a light source for illuminating the face of the reading matter, means masking the light source and having an aperture passing a beam of light to illuminate a transverse area of reading matter of a width and length to include one or more complete lines of reading matter, means controlling the position of said light beam and illuminated area with respect to the reading matter, and means to move said controlling means to cause the illuminated area to move at a steady pace downward over the reading matter.

References Cited in the file of this patent

UNITED STATES PATENTS

| | | |
|---|---|---|
| 1,451,182 | Searle | Apr. 10, 1923 |
| 1,916,567 | Grant | July 4, 1933 |
| 2,039,406 | Greensfelder | May 5, 1936 |
| 2,078,834 | Brennan | Apr. 27, 1937 |
| 2,188,210 | Smith | Jan. 23, 1940 |
| 2,194,836 | Savage | Mar. 26, 1940 |
| 2,252,726 | Peck | Aug. 19, 1941 |
| 2,357,593 | Leavell | Sept. 5, 1944 |
| 2,372,494 | Hogan et al. | Mar. 27, 1945 |
| 2,420,716 | Morton et al. | May 20, 1947 |
| 2,457,099 | Zworykin et al. | Dec. 21, 1948 |
| 2,457,456 | Flory | Dec. 28, 1948 |
| 2,530,702 | Johnson | Nov. 21, 1950 |
| 2,535,243 | Taylor | Dec. 26, 1950 |
| 2,605,558 | Lehner et al. | Aug. 5, 1952 |
| 2,632,258 | Erickson | Mar. 24, 1953 |